United States Patent [19]

Takaki et al.

[11] Patent Number: 4,992,556

[45] Date of Patent: Feb. 12, 1991

[54] PROCESS FOR THE PREPARATION OF INDIGO COMPOUNDS

[75] Inventors: Usaji Takaki, Kanagawa; Hiroharu Suzuki, Tokyo; Yoshihiro Yamamoto, Kanagawa; Shinobu Aoki, Kanagawa; Isao Hara, Kanagawa, all of Japan

[73] Assignee: Mitsui Toatsu Chemicals, Incorporated, Tokyo, Japan

[21] Appl. No.: 314,021

[22] Filed: Feb. 23, 1989

[30] Foreign Application Priority Data

Feb. 23, 1988 [JP] Japan .................................. 63-38713
Mar. 2, 1988 [JP] Japan .................................. 63-47565

[51] Int. Cl.$^5$ ........................................... C07D 403/04
[52] U.S. Cl. .................................... 548/457; 548/459

[58] Field of Search ................................ 548/457, 459

[56] References Cited

FOREIGN PATENT DOCUMENTS 0124027  9/1978  Japan ................................... 548/457
9613  of 1902  United Kingdom ................ 548/457

Primary Examiner—David B. Springer
Attorney, Agent, or Firm—Millen, White & Zelano

[57] ABSTRACT

An indigo compound is prepared by reacting an indole compound unsubstituted at the 2- and 3-positions with an organic hydroperoxide, preferably in the presence of a metallic compound catalyst capable of catalyzing the oxidation of the carton atom at the 3-position of the indole compound, such as a compound of a metal of group 4A, 5A or 6A of the periodic table.

27 Claims, No Drawings

PROCESS FOR THE PREPARATION OF INDIGO COMPOUNDS

BACKGROUND OF THE INVENTION

1. Field of the Invention

This invention relates to a process for the preparation of an indigo compound by reacting an indol compound which is unsubstituted at the 2- and 3-positions with an organic hydroperoxide.

2. Description of the Prior Art

Indigo compounds are important compounds that are useful as dyes. The presently employed industrial processes for the preparation of indigo comprise forming an N-phenylglycine salt from aniline and chloroacetic acid, or aniline, cyanic acid and formaldehyde, converting this salt into an indoxyl compound by alkali fusion at elevated temperature, and then oxidizing this compound with air. However, these processes are not only complicated ones having many steps, they also require the use of large amounts of potassium hydroxide and sodium hydroxide. Moreover the recovery and reuse of used potassium hydroxide and sodium hydroxide has the disadvantage of consuming much energy and requiring special equipment. Therefore, conversion to a simpler process has been desired.

Meanwhile, it has been reported in the field of synthetic organic chemistry that indigo was formed by oxidative dimerization of indole. Specifically, Obata et al. have reported that, when peracetic acid, which is a percarboxylic acid, was produced from hydrogen peroxide and acetic acid in the reaction system and reacted with indole, a trimer of indole, or 2,2-diindyl-Ψ-indoxyl, was obtained and, in addition, a small amount of indigo was formed as a by-product (Bull. Agr. Chem. Soc. Japan, Vol. 20, pp. 80–83, 1956). Moreover, B. Witkop et al. have reported that, when perbenzoic acid, which is a percarboxylic acid, was reacted with indole in a chloroform solvent by allowing the reaction mixture to stand in a refrigerator overnight, a very small amount of indigo was formed together with a variety of other products (Justus Liebigs Annalen der Chemie, Vol. 558, pp. 91–98, 1947). Furthermore, A. K. Sheinkman et al. have reported that, when hydrogen peroxide, which is an inorganic peroxide, was reacted with indole in methanol, the trimer 2,2-diindyl-Ψ-indoxyl was obtained in high yield, as was the case with the reaction using peracetic acid, and the formation of indigo was only detected by chromatography (Khim. Geterotsikl. Soedin., Vol. 11, pp. 1490–1496, 1978).

However, the object of these reports was to study the reactivity of indole, and the indigo that is the desired product in the present invention was nothing but a by-product formed in very small amounts. Accordingly, these are not satisfactory processes for the preparation of indigo compounds.

SUMMARY OF THE INVENTION

It is an object of the present invention to provide an improved and simple process for the preparation of an indigo compound.

It is another object of the present invention to provide a process for the preparation of an indigo compound by using an indole compound as a starting material in which the formation of by-products is minimized.

Other objects of the present invention will be apparent from the following description.

The present inventors have made a constant endeavor to develop a method for preparing indigo selectively from indole, which can readily be obtained industrially, as a starting material and suppressing the formation of by-products such as 2,2-diindyl-Ψ-indoxyl, with a special view to seeking an effective oxidizing agent. As a result of exhaustive investigation on oxygen and a variety of organic and inorganic oxidizing agents, it has been found that, if an organic hydroperoxide is used as the oxidizing agent and reacted with indole, indigo can readily be obtained in a single step without forming any appreciable amount of 2,2-diindyl-Ψ-indoxyl. This is quite unexpected because the use of organic hydroperoxides for this purpose has been unknown in the prior art. Moreover, it has also been found that this method can be applied to other indole compounds having no substituent at the 2- and 3-positions to produce corresponding indigo compounds. The present invention has been completed on the basis of these findings.

According to the present invention, there is provided a process for the preparation of an indigo compound which comprises reacting a corresponding indole compound which is unsubstituted at the 2- and 3-positions with an organic hydroperoxide.

DESCRIPTION OF THE PREFERRED EMBODIMENTS

The indole compound which is unsubstituted at the 2- and 3-position, which is used as one of the starting materials in the process of the present invention, includes those selected from the group consisting of one or more of indole; alkylindoles having 1 to 4 alkyl groups of 1 to 10 carbon atoms, such as 1-methylindole, 4-ethylindole, 5-methylindole, 6-methylindole, 6-isopropylindole, 7-methylindole and 4,5-dimethylindole; halogenated indoles having 1 to 4 halogen atoms, such as 4-chloroindole, 5-chloroindole, 5,7-dichloroindole, 5-bromoindole, 6-bromoindole, 5,7-dibromoindole and 4-chloro-5-bromoindole; hydroxyindoles having 1 to 4 hydroxyl groups, such as 4-hydroxyindole, 5-hydroxyindole and 4,5-dihydroxyindole; halogenated alkylindoles having 1 to 3 halogen atoms and 1 to 3 alkyl groups of 1 to 10 carbon atoms, such as 4-chloro-5-ethylindole, 6-chloro-4-methylindole, 4-bromo-5-ethylindole and 5-bromo-4-methylindole; nitroindoles having 1 to 4 nitro groups, such as 4-nitroindole, 5-nitroindole and 7-nitroindole; indole-carboxylic acids, such as indole-5-carboxylic acid, and esters thereof; sulfonated indoles; and indoles bearing a combination of 2 or more different such groups. At positions other than the 2- and 3-positions, these indole compounds can have any substituents that do not interfere with the reaction.

The organic hydroperoxide, which is used as the other starting material in the process of the present invention, is an organic compound having at least one hydroperoxy (—OOH) group. Useful organic hydroperoxides are enumerated, for example, in the tables given in D. Swern, "Organic Peroxides, Vol. II", Wiley-Interscience (1971), pp. 107–127 and in the tables given in A. G. Davies, "Organic Peroxides", Butterworths (1961), pp. 9–33 whose disclosure is incorporated hereon by reference.

Among these organic hydroperoxides, secondary and tertiary alkyl hydroperoxides having 3 to 30 carbon atoms in the alkyl moiety, such as tert-butyl hydroperoxide, 1-phenylethyl hydroperoxide, 1-methyl-1-phenylethyl hydroperoxide (so-called cumene hydroperoxide), bis(1-methylethyl)phenyl hydroperoxide, 1-methyl-1(4-mathylcyclohexyl)ethyl hydroperoxide, 2,5-dimethylhexane-2,5-dihydroperoxide and 1,1,3,3-tetramethylbutyl hydroperoxide, are preferred.

These organic hydroperoxides may be used alone, or two or more of them may be used in admixture or in sequence. Alternatively, it is also possible to use a suitable combination of components (e.g., isopropylbenzene and an oxygen-containing gas) which can produce such an organic hydroperoxide in the reaction system. Although the amount of organic hydroperoxide used is not critical, it is usually in the range of 0.01 to 100 moles, preferably 0.1 to 20 moles, per mole of the indole compound.

In the process of the present invention, no particular limitation is placed on the method by which the reaction is carried out. There may be employed any method that permits at least effective mixing of the indole compound and the organic hydroperoxide, and the reaction may be carried out in any of batch, semibatch and continuous operations. More specifically, there may be employed the method in which the indole compound and the organic hydroperoxide are charged into the reactor all at once, the method in which one of the reactants is continuously or intermittently added to the other, or the method in which both reactants are continuously or intermittently fed to the reactor.

The reaction temperature and the reaction time may vary according to the types of the indole compound and the organic hydroperoxide used as the starting materials. The reaction s usually conducted in the range of $-10°$ to $200°$ C. If the reaction temperature is too low, the reaction will become unduly slow, while if it is too high, the reaction may be attended by the danger of violent decomposition of the organic hydroperoxide. Preferably, the reaction is conducted in the range of $10°$ to $120°$ C. The reaction time is usually within 100 hours and preferably about 0.1 to 50 hours. According to circumstances, the reaction may be carried out under subatmospheric, atmospheric or superatmospheric pressure.

In the process of the present invention, the reaction may be carried out under an atmosphere of an inert gas or in the presence of molecular oxygen such as air.

Although the process of the present invention may be carried out in the absence of solvent, it is usually carried out in the presence of a solvent. For this purpose, there may be used any solvent that does not interfere with the reaction. Useful solvents include, for example, water; aliphatic and alicyclic hydrocarbons such as n-hexane, n-pentane and cyclohexane; aromatic hydrocarbons such as benzene, toluene, ethylbenzene and cumene; aliphatic and aromatic halogen compounds such as dichloromethane, chloroform, chlorobenzene and dichlorobenzene; ethers such as diethyl ether, diphenyl ether, tetrahydrofuran and ethylene glycol diethyl ether; alcohols such as methanol, ethanol, tert-butanol, cyclohexanol, benzyl alcohol and propylene glycol; ketones such as acetone, methyl ethyl ketone and acetophenone; esters such as ethyl acetate and ethyl propionate; carbonates such as dimethyl carbonate; and aromatic nitro compounds such as nitrobenzene. These solvents may be used alone or in admixture of two or more. When these solvents are used, it does not matter whether the reaction mixture forms a homogeneous system or a heterogeneous system consisting of at least two distinct phases.

In the process of the present-invention, the yield of the indigo compound or the reaction rate can be improved by using a metallic compound catalyst which catalyzes the oxidation of the carbon atom at the 3-position of the indole compound. Accordingly, it is very preferable to use such a catalyst. The term "metallic compound catalyst" comprehends both organic and inorganic compounds of metals which, in the reaction of the indole compound with the organic hydroperoxide, can cause carbon atom at the 3-position of the indole compound to be oxidized by an oxygen atom. For example, this catalyst is at least one compound selected from the group consisting of compounds of the metals of group 4A, 5A and 6A of the periodic table. Specifically, useful metallic compounds include various compounds of titanium, zirconium, hafnium, vanadium, niobium, tantalum, chromium, molybdenum and tungsten. More specifically, they include inorganic compounds of the aforesaid metals, such as halides, oxyhalides, oxides, mixed oxides, sulfides, borides, phosphides, hydroxides, oxyhydroxides, cyano complexes, inorganic acid salts (e.g., sulfates, nitrates and phosphates), metallic oxyacids (e.g., titanic acid, molybdic acid and tungstic acid) and salts thereof, and heteropoly-acids (e.g., phosphomolybdic acid and silicotungstic acid) and salts thereof; compounds of the aforesaid metals having an organic group in at least a portion thereof, such as organic acid salts (e.g., acetates, oxalates, benzoates and naphthenates), alkoxides (e.g., those derived from isopropyl alcohol), phenoxides (e.g., those derived from phenol and m-chlorophenol), and halogen compounds having an alkoxy or phenoxy group; complex compounds of the aforesaid metals, such as carbonyl complexes, amine complexes, pyridine complexes (e.g., those derived from pyridine and bipyridine), oxo complexes, thiolate complexes (e.g., those derived from cysteine and dithiocatechol), sulfido complexes, dithiocarbamate complexes, thiocyanato complexes, isocyanato complexes, phosphine complexes (e.g., those derived from triphenylphosphine and 1,2-diphenylphosphinoethane), phosphoryl complexes, phthalocyanine complexes, porphyrin complexes, nitrile complexes, ether complexes, ketone complexes, $\beta$-ketocarbonyl complexes (e.g., those derived from acetylacetone), alkyl and allene complexes, olefin complexes and cyclopentadienyl complexes; and compounds of the aforesaid metals coming under two or more of the foregoing categories. These metallic compounds may be used alone or as an admixture of two or more. It is also possible to use a suitable combination of components which can produce any of these metallic compounds in the reaction system. Although these metallic compounds are preferably soluble in the reaction mixture, they may be partially or totally insoluble therein. These metallic compounds are usually used in an amount of not greater than 0.5 mole, preferably 0.00001 to 0.1 mole, per mole of the indole compound.

In the process of the present invention, the desired indigo compound can be obtained by working up the resulting reaction mixture in the usual manner. On completion of the reaction, most of the formed indigo compound has usually separated out as a precipitate. Therefore, the indigo compound can easily be recovered in the form of a solid according to a conventional solid-liquid separation technique such as filtration, centrifugation or decantation. Where the amount of the precipitated indigo compound is insufficient, it is also possible to concentrate the reaction mixture and then recover the resulting precipitate therefrom.

The present invention is further illustrated by the following examples. These examples are intended to illustrate the invention and are not to be construed to limit the scope of the invention.

EXAMPLE 1

A four neck flask having a capacity of 100 ml and fitted with a stirrer, a thermometer, a dropping funnel and a cooling coil was charged with 5.0 g (42.7 mmoles) of indole and 30 g of toluene. While this mixture was being heated at 80° C. on an oil bath and stirred under an atmosphere of air, 23.5 g (128.0 mmoles as cumene hydroperoxide, i.e., 1-methyl-1-phenylethyl hydroperoxide) of an 83 wt. % solution of cumene hydroperoxide in cumene (hereinafter abbreviated as CHP solution) was added dropwise thereto over a period of one hour. Thereafter, the reaction was continued for 10 hours under the same conditions. The reaction mixture was homogeneous at the start of the reaction, but a deep blue solid gradually separated out with the progress of the reaction. After completion of the reaction, this reaction mixture was filtered. The solid so separated was washed with a small amount of toluene and then dried at 50° C. under reduced pressure to obtain 0.34 g of a deep blue solid product. Elemental analysis and IR spectroscopic analysis revealed that this product was indigo. The molar yield of the isolated indigo as based on the charged indole (hereinafter referred to briefly as the indigo yield) was 6.1% and the indigo yield per hour, which serves as a measure of the rate of formation, was 0.6%. When the filtrate of the reaction mixture was analyzed by high-performance liquid chromatography, the formation of the trimer 2,2-diindyl-$\psi$-indoxyl was detected, but in an amount too small for quantification.

EXAMPLE 2

Reaction and after-treatment were carried out in the same manner as in Example 1, except that 11.3 mg (0.043 mmole) of molybdenum hexacarbonyl was additionally used as a catalyst and the reaction time was changed to 5 hours. Thus, there was obtained 2.91 g of indigo. The indigo yield was 52.0% and the indigo yield per hour was 10.4%.

EXAMPLE 3

Reaction was carried out in the same manner as in Example 1, except that 5.0 g (33.0 mmoles) of 5-chloroindole was used in place of indole, 21.6 g (165.4 mmoles as tert-butyl hydroperoxide) of a 69 wt. % aqueous solution of tert-butyl hydroperoxide was used in place of the CHP solution, and the reaction temperature and the reaction time were changed to 60° C and 20 hours, respectively. Thereafter, the resulting reaction mixture was filtered. The solid so separated was washed with a small amount of methanol and then dried at 50° C. under reduced pressure to obtain 0.23 g of 5,5'-dichloroindigo. When this product was analyzed in the same manner as in Example 1, no formation of the trimer was detected.

EXAMPLE 4

A three neck flask having a capacity of 100 ml and fitted with a stirrer, a thermometer and a cooling coil was charged with 1.0 g (8.5 mmoles) of indole, 22.5 mg (0.085 mmole) of molybdenum hexacarbonyl, 30 g of toluene and 7.83 g (42.7 mmoles as cumene hydroperoxide) of the same CHP solution as used in Example 1, all at once. This mixture was heated at 80° C. on an oil bath and stirred under an atmosphere of air for 5 hours to effect the reaction Thereafter, the resulting reaction mixture was worked up in the same manner as in Example 1. Thus, there was obtained 0.57 g of indigo. The indigo yield was 50.9% and the indigo yield per hour was 10.2%.

EXAMPLE 5-15

Reaction and after-treatment were carried out in the same manner as in Example 4, except that the amounts of indole and the CHP solution, the types and amounts of the catalyst and the solvent, the reaction temperature and the reaction time were changed as shown in Table 1. The results thus obtained, together with those of Examples 2 and 4, are shown in Table 1.

EXAMPLES 16-20

Reaction and after-treatment were carried out in the same manner as in Example 2, except that, in place of the CHP solution, each of the organic hydroperoxides shown in Table 2 was used in the indicated amount, and the amount of indole and the reaction temperature were changed as shown in Table 2. The results thus obtained are shown in Table 2.

EXAMPLES 21-23

Reaction was carried out in the same manner as in Example 4, except that, in place of indole, each of the indole compounds shown in Table 3 was used in the indicated amount, and the amount of the CHP solution was changed as shown in Table 3. Thereafter, the resulting reaction mixture was filtered. The solid so separated was washed with a small amount of methanol and then dried at 50° C. under reduced pressure to obtain the corresponding indigo compound. The isolated indigo compound, its molar yield based on the charged indole compound (yield of the indigo compound), and the yield per hour are shown in Table 3.

EXAMPLE 24

The same ingredients as used in Example 4 were charged all at once. After nitrogen was passed through this mixture to displace the air, the mixture was heated at 80° C. on an oil bath and stirred under an atmosphere of nitrogen for 5 hours to effect the reaction. Thereafter, the resulting reaction mixture was worked up in the same manner as in Example 4. The indigo yield was 46.1% and the indigo yield per hour was 9.2%. Example 4 in which the reaction was carried out under an atmosphere of air gave somewhat better results, though the difference was not substantial.

EXAMPLE 25

A four neck flask having a capacity of 100 ml and fitted with a stirrer, a thermometer, a gas inlet tube and a cooling coil was charged with 5.0 g (42.7 mmoles) of indole, 11.3 mg (0.043 mmole) of molybdenum hexacarbonyl and 40 g of cumene, i.e., isopropylbenzene. While this mixture was being stirred, air was blown therethrough at a rate of 300 ml/min. Then, the reaction was started by heating the reaction mixture to about 80° C. One hour after the start of the reaction, a sample was taken from the reaction mixture and subjected to iodometry and gas chromatography. Thus, it was confirmed that cumene hydroperoxide has been produced in the system. After the reaction was continued for 10 hours, the resulting reaction mixture was worked up in the same manner as in Example 1. Consequently, the indigo yield was 8.0%.

EXAMPLE 26

Reaction and after-treatment were carried out in the same manner as in Example 4 except that 20 g of cumene was used in place of the toluene, 17.0 g (25.7 mmoles as cumene hydroperoxide) of a 23 wt.% solution of cumene hydroperoxide in cumene was used in place of the CHP solution used in Example 4, and the reaction temperature was changed to 110° C. Thus, there was obtained 0.43 g of indigo. The indigo yield was 38.1% and the indigo yield per hour was 7.6%.

TABLE 1

| | Indole Amount (g) | CHP solution Amount (g) | Catalyst Type | Catalyst Amount (mg) | Solvent Type | Solvent Amount (g) | Temperature (°C.) | Time (hr) | Indigo yield (%) | Indigo yield per hour (%) |
|---|---|---|---|---|---|---|---|---|---|---|
| Example 2 | 5.0 | 23.5 | $Mo(CO)_6$ | 11.3 | Toluene | 30 | 80 | 5 | 52.0 | 10.4 |
| Example 4 | 1.0 | 7.83 | $Mo(CO)_6$ | 22.5 | Toluene | 30 | 80 | 5 | 50.9 | 10.2 |
| Example 5 | 1.0 | 7.83 | $[Mo(acac)_2]_2$ | 50.0 | Benzene | 30 | 80 | 5 | 54.2 | 10.8 |
| Example 6 | 1.0 | 4.68 | $MoO_2(acac)_2$ | 2.8 | Toluene | 30 | 80 | 5 | 28.4 | 5.7 |
| Example 7 | 1.0 | 4.68 | $MoCl_5$ | 23.2 | Methylene chloride | 50 | 20 | 10 | 9.2 | 0.9 |
| Example 8 | 1.0 | 7.83 | $MoO_3$ | 12.2 | ODCB | 20 | 100 | 2 | 23.7 | 11.9 |
| Example 9 | 1.0 | 7.83 | $MoS_2$ | 136.1 | Nitrobenzene | 30 | 80 | 5 | 19.4 | 3.9 |
| Example 10 | 5.0 | 39.0 | $H_2MoO_4 \cdot H_2O$ | 15.3 | Toluene | 30 | 80 | 5 | 8.5 | 1.7 |
| Example 11 | 5.0 | 23.5 | $H_3[PMo_{12}O_{40}] \cdot nH_2O$ | 13.0 | Toluene | 30 | 80 | 5 | 11.3 | 2.3 |
| Example 12 | 1.0 | 7.83 | $Ti(OiPr)_4$ | 24.2 | Toluene | 30 | 80 | 5 | 14.8 | 3.0 |
| Example 13 | 1.0 | 4.68 | $TiO(acac)_2$ | 2.2 | Toluene | 30 | 80 | 5 | 11.9 | 2.4 |
| Example 14 | 1.0 | 4.68 | $VO(acac)_2$ | 0.45 | Toluene | 30 | 80 | 10 | 4.3 | 0.4 |
| Example 15 | 5.0 | 23.5 | $W(CO)_6$ | 299.1 | Toluene | 30 | 80 | 5 | 15.1 | 3.0 |

Note:
"acac" and "iPr" represent acetylacetonato and isopropyl groups, respectively, and "ODCB" represents o-dichlorobenzene.
"CHP solution" represents 83 wt. % solution of cumene hydroperoxide in cumene.

TABLE 2

| | Indole Amount (g) | Organic hydroperoxide Type | Organic hydroperoxide Amount (g) | Temperature (°C.) | Indigo yield (°C.) | Indigo yield per hour (%) |
|---|---|---|---|---|---|---|
| Example 16 | 1.0 | 69 wt. % aqueous solution of tert-butyl hydroperoxide | 5.6 | 80 | 29.3 | 5.9 |
| Example 17 | 1.0 | 54 wt. % solution of bis(1-methylethyl)phenyl hydroperoxide in diisopropylbenzene | 9.2 | 80 | 52.2 | 10.4 |
| Example 18 | 5.0 | 53 wt. % solution of 1-methyl-1-(4-methylcyclohexyl)ethyl hydroperoxide in p-menthane | 41.3 | 80 | 50.3 | 10.1 |
| Example 19 | 1.0 | 90 wt. % solution of 1,1,3,3-tetramethylbutyl hydroperoxide in 1,1,3,3-tetramethylbutane | 4.2 | 80 | 54.2 | 10.8 |
| Example 20 | 2.0 | 55 wt. % solution of cyclohexanone peroxide in cyclohexanone | 11.4 | 60 | 9.4 | 1.9 |

TABLE 3

| | Indole compound Type | Amount (g) | CHP solution Amount (g) | Indigo compound | Yield of indigo compound (%) | Yield per hour (%) |
|---|---|---|---|---|---|---|
| Example 21 | 5-Chloroindole | 3.0 | 18.0 | 5,5'-dichloroindigo | 41.6 | 8.3 |
| Example 22 | 6-Methylindole | 1.0 | 7.0 | 6,6'-dimethylindigo | 49.8 | 10.0 |
| Example 23 | Indole-5-carboxylic acid | 2.0 | 6.8 | Indigo-5,5'-dicarboxylic acid | 24.1 | 4.8 |

Note:
"CHP solution" represents 83 wt. % solution of cumene hydroperoxide in cumene.

What is claimed is:

1. A process for the preparation of an indigo compound which comprises converting an indole compound which is unsubstituted at the 2- and 3-positions by reaction in one step with an organic hydroperoxide and recovering the indigo compound thus produced.

2. A process as claimed in claim 1, wherein the indole compound is selected from the group consisting of indole, alkylindoles, halogenated indoles, hydroxyindoles, halogenated alkylindoles, nitroindoles, indolecarboxylic acids and esters thereof, and sulfonated indoles.

3. A process as claimed in claim 1, wherein the indole compound is indole.

4. A process as claimed in claim 1, wherein the organic hydroperoxide is a secondary or tertiary alkyl hydroperoxide.

5. A process as claimed in claim 1, wherein the organic hydroperoxide is selected from the group consisting of tert-butyl hydroperoxide, 1-phenylethyl hydroperoxide, 1-methyl-1-phenylethyl hydroperoxide, bis(1-methylethyl)phenyl hydroperoxide, 1-methyl-1-(4-methylcyclohexyl)ethyl hydroperoxide, 2,5-dimethylhexane-2,5-dihydroperoxide and 1,1,3,3-tetramethylbutyl hydroperoxide.

6. A process as claimed in claim 1, wherein the organic hydroperoxide is tert-butyl hydroperoxide, 1phenylethyl hydroperoxide or 1-methyl-1-phenylethyl hydroperoxide.

7. A process as claimed in claim 1, wherein the organic hydroperoxide is used in an amount of 0.1 to 20 moles per mole of the indole compound.

8. A process as claimed in claim 1, wherein the reaction temperature is in the range of 10° to 120° C.

9. A process as claimed in claim 1, wherein the reaction time is about 0.1 to 50 hours.

10. A process as claimed in claim 1, wherein the reaction is carried out in the presence as solvent of at least one compound selected from the group consisting of water, aliphatic and alicyclic hydrocarbons, aromatic hydrocarbons, aliphatic and aromatic halogen compounds, ethers, alcohols, ketones, esters, carbonates and aromatic nitro compounds.

11. A process as claimed in claim 1, wherein the formed indigo compound is recovered from the reaction mixture as a precipitated solid.

12. A process as claimed in claim 1, wherein the reaction is carried out in the presence of a metallic compound catalyst which catalyzes the oxidation of the carbon atom at the 3-position of the indole compound.

13. A process as claimed in claim 12, wherein the metallic compound is selected from the group consisting of compounds of the metals of groups 4A, 5A and 6A of the periodic table.

14. A process as claimed in claim 12, wherein the metallic compound is a compound of titanium, vanadium, molybdenum or tungsten.

15. A process as claimed in claim 12, wherein the metallic compound is a molybdenum compound.

16. A process as claimed in claim 12, wherein the metallic compound is used in an amount of 0.00001 to 0.1 mole per mole of the indole compound.

17. A process as claimed in claim 12, wherein the indole compound is selected from the group consisting of indole, alkylindoles, halogenated indoles, hydroxyindoles, halogenated alkylindoles, nitroindoles, indolecarboxylic acids and esters thereof, and sulfonated indoles.

18. A process as claimed in claim 12, wherein the indole compound is indole.

19. A process as claimed in claim 12, wherein the organic hydroperoxide is a secondary or tertiary alkyl hydroperoxide.

20. A process as claimed in claim 12, wherein the organic hydroperoxide is selected from the group consisting of tert-butyl hydroperoxide, 1-phenylethyl hydroperoxide, 1-methyl-1-phenylethyl hydroperoxide, bis(1-methylethyl)phenyl hydroperoxide, 1-methyl-1-(4methylcyclohexyl)ethyl hydroperoxide, 2,5-dimethylhexane-2,5-dihydroperoxide and 1,1,3,3tetramethylbutyl hydroperoxide.

21. A process as claimed in claim 12, wherein the organic hydroperoxide is tert-butyl hydroperoxide, 1-phenylethyl hydroperoxide or 1-methyl-1-phenylethyl hydroperoxide.

22. A process as claimed in claim 12, wherein the organic hydroperoxide is used in an amount of 0.1 to 20 moles per mole of the indole compound.

23. A process as claimed in claim 12, wherein the reaction temperature is in the range of 10° to 120° C.

24. A process as claimed in claim 12, wherein the reaction time is about 0.1 to 50 hours.

25. A process as claimed in claim 12, wherein the reaction is carried out in the presence as a solvent of at least one compound selected from the group consisting of water, aliphatic and alicyclic hydrocarbons, aromatic hydrocarbons, aliphatic and aromatic halogen compounds, ethers, alcohols, ketones, esters, carbonates and aromatic nitro compounds.

26. A process as claimed in claim 12, wherein the formed indigo compound is recovered from the reaction mixture as a precipitated solid.

27. A process as claimed in claim 12, wherein the indole compound is indole; wherein the organic hydroperoxide is tert-butyl hydroperoxide, 1-phenylethyl hydroperoxide or 1-methyl-1-phenylethyl hydroperoxide; wherein the organic hydroperoxide is used in an amount of 0.1 to 20 moles per mole of the indole compound; and wherein the metallic compound is selected from the group consisting of compounds of the metals of groups 4A, 5A and 6A of the periodic table.

* * * * *